US009971675B2

(12) United States Patent
Lincoln et al.

(10) Patent No.: US 9,971,675 B2
(45) Date of Patent: May 15, 2018

(54) TRIGGERING DEBUG PROCESSING WITHIN A SCALABLE CLOUD ENVIRONMENT

(71) Applicant: International Business Machines Corporation, Armonk, NY (US)

(72) Inventors: Nicholas K. Lincoln, Middle Wallop (GB); Josephine D. Messa, Winchester (GB); Simon D. Stone, Sherfield-on-Loddon (GB)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 15/089,734

(22) Filed: Apr. 4, 2016

(65) Prior Publication Data

US 2017/0286268 A1  Oct. 5, 2017

(51) Int. Cl.
G06F 11/00 (2006.01)
G06F 11/36 (2006.01)
G06F 9/455 (2018.01)
H04L 29/06 (2006.01)

(52) U.S. Cl.
CPC ...... G06F 11/3664 (2013.01); G06F 9/45558 (2013.01); G06F 11/366 (2013.01); G06F 11/3612 (2013.01); G06F 11/3636 (2013.01); H04L 63/08 (2013.01); G06F 2009/45591 (2013.01)

(58) Field of Classification Search
CPC ............. G06F 11/3612; G06F 11/3636; G06F 11/3664

See application file for complete search history.

(56) References Cited

U.S. PATENT DOCUMENTS

| 7,665,139 B1 * | 2/2010 | Szor ..................... G06F 21/554 713/100 |
| 7,779,390 B1 | 8/2010 | Allavarpu et al. |
| 8,819,640 B2 | 8/2014 | Bates et al. |
| 8,874,971 B1 | 10/2014 | Hayden et al. |
| 9,053,343 B1 | 6/2015 | Fuller et al. |
| 9,117,019 B2 | 8/2015 | Wintergerst et al. |
| 9,122,841 B2 | 9/2015 | Pavlov et al. |

(Continued)

FOREIGN PATENT DOCUMENTS

CN  104580514 A  4/2015

OTHER PUBLICATIONS

Heidloff, Niklas, "Remote Debugging of Liberty Applications in Bluemix", posted on Feb. 23, 2015 by Niklas Heidloff Developer Advocate for IBM Bluemix, <http://heidloff.net/article/22.12.2014105136NHEDKU.htm>, 3 pages.

(Continued)

*Primary Examiner* — Charles Ehne
(74) *Attorney, Agent, or Firm* — Edward J. Wixted, III

(57) ABSTRACT

Use of tokens, included in a client request that requests a computer operation to be performed, to cause the processor that performs the requested computer operation to enter a "thread-specific-debug state." In the thread-specific debug state, debug information is collected and logged from some threads running on the processor, but not from all threads running on the processor. This can provide more targeted, manageable and/or helpful debugging logs.

20 Claims, 2 Drawing Sheets

(56) References Cited

U.S. PATENT DOCUMENTS

| | | | |
|---|---|---|---|
| 2004/0168155 A1* | 8/2004 | O'Farrell | G06F 11/3644 |
| | | | 717/129 |
| 2011/0145836 A1 | 6/2011 | Wheeler et al. | |
| 2013/0219363 A1 | 8/2013 | Wu et al. | |
| 2014/0033180 A1 | 1/2014 | Bates et al. | |
| 2014/0173565 A1 | 6/2014 | Scholl et al. | |
| 2015/0033078 A1 | 1/2015 | Wintergerst et al. | |
| 2016/0062870 A1* | 3/2016 | Menahem | G06F 11/362 |
| | | | 717/125 |
| 2016/0364341 A1* | 12/2016 | Banginwar | G06F 12/145 |
| 2017/0220451 A1* | 8/2017 | Mankovskii | G06F 11/3612 |

OTHER PUBLICATIONS

IBM, "Debugging", IBM Bluemix, Last updated Nov. 19, 2015, 1 page, <https://www.ng.bluemix.net/docs/debug/index.html>.

Mueller, Patrick, "Node.js debugging starts with better logging!", IBM BlueMix Dev, Mar. 10, 2015, <https://developer.ibm.com/bluemix/2015/03/10/nodejsbetterlogging/>, 11 pages.

Parameswaran, Sabha, "Remote Triggers for Applications on Cloud Foundry", Pivotal Cloud Foundry, Jun. 3, 2014, <https://blog.pivotal.io/pivotal-cloud-foundry/products/remote-triggers-for-applications-on-cloud-foundry>, pp. 1-7.

Yuen, Elson, "Debug and publish Java applications to Liberty on Bluemix", YouTube, Published on Feb 20, 2015, 4 pages.

Vennam, Ram, "Remote debug Java applications on Bluemix using Eclipse", BlueMix Dev, Sep. 25, 2015, <https://developer.ibm.com/bluemix/2015/09/25/remotedebugjavaapplicationsonbluemix/>, 4 pages.

\* cited by examiner

TRIGGERING DEBUG PROCESSING WITHIN A SCALABLE CLOUD ENVIRONMENT

BACKGROUND

The present invention relates generally to debugging of machine executable code, and more particularly to entry of a "thread-specific debug state."

A "thread-specific debugging state" refers to data collection, at a thread-specific level of granularity, for the purpose of analyzing and resolving a software problem. When in a thread-specific debugging state, data collection (for problem analysis and resolution) is enabled, but restricted to specific thread(s) at which the debugging state is directed.

A token is a data object which represents the right to perform some operation. Types of token include, without limitation: (i) session token, a data object used to identify a session in a stateless protocol such as hypertext transfer protocol (http) communications; (ii) security token, used to prove a user's identity, the security token acting as an electronic "key" that enables access to a secured resource; and/or (iii) access token, a data object including the security status of a process or thread.

SUMMARY

According to an aspect of the present invention, there is a method, computer program product and/or system [if there is preamble language insert it here] that performs the following operations (not necessarily in the following order): (i) receives, by a server computer, through a communication network and from a requestor client application, a client request including: a request for the server computer to perform a computer operation, and a debug token; (ii) responsive to the client request, starts to perform, by the server computer, the computer operation on a sub-set of thread(s) running on a set of processor(s), where the set of processor(s) are running a set of thread(s) that: includes all threads of the sub-set of threads, and includes at least one thread that is not in the sub-set of thread(s); and (iii) enters, by the set of processor(s), a thread-specific debug state so that: debug information is logged with respect to the sub-set of thread(s), and debug information is not logged with respect to any thread(s) included in the set of thread(s) but not included in the sub-set of thread(s).

DETAILED DESCRIPTION

Figure 1:
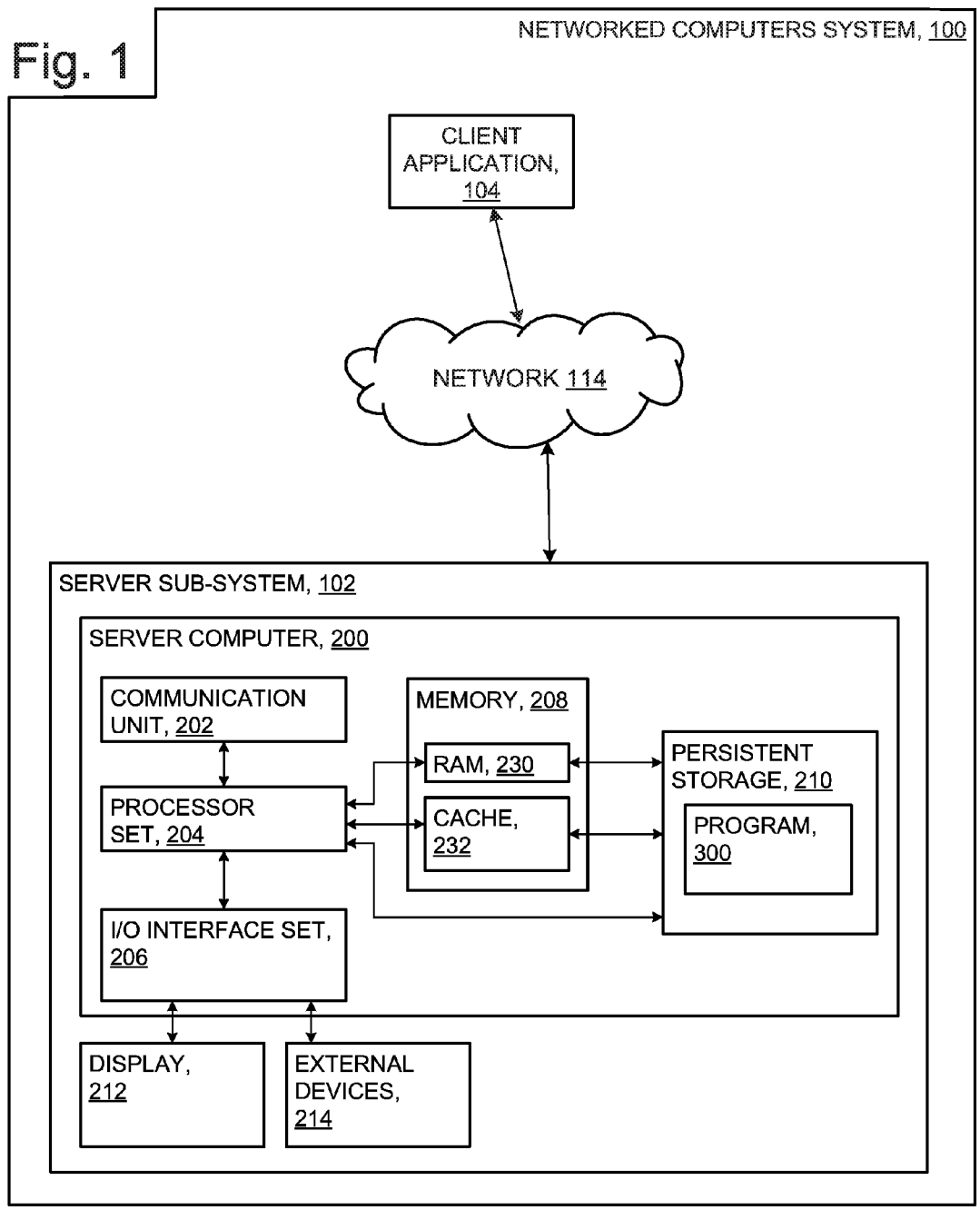
FIG. 1 is a block diagram of a first embodiment of a system according to the present invention.

Some embodiments of the present invention are directed to systems, methods and/or software that use tokens (included in a client request that requests a computer operation to be performed) to cause the processor that performs the requested computer operation to enter a "thread-specific-debug state" where debug information is collected and logged from some threads running on the processor, but not from all threads running on the processor. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: sub-system 102; client application 104; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
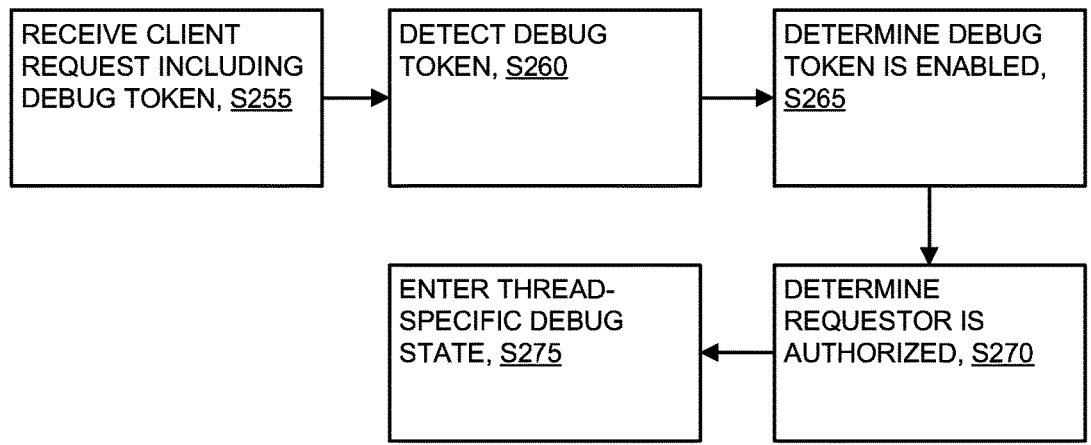
FIG. 2 is a flowchart showing a first embodiment method performed, at least in part, by the first embodiment system.
Figure 3:
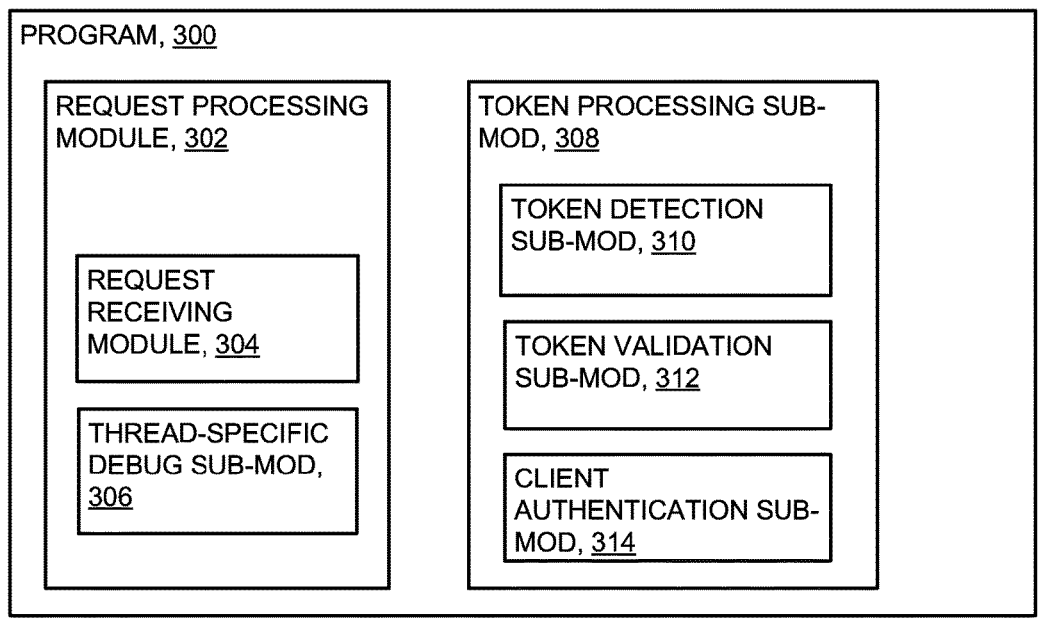
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where request receiving module 304, of request processing module 302, of program 300, receives a client request (not shown in the Figures) including: (i) a request for performing a computer operation; and (ii) a debug token (which, as will be further discussed below, effectively requests not merely a debug state, but, more specifically, a "thread-specific debug state"). In this example, the client request is: (i) written according a hypertext transport protocol (http); (ii) received from a web browser application; and (iii) requests a computer operation that is service of a web page be sent from server computer 200 through network 114 from client application 104 (see FIG. 1). Alternatively, the requested computer operation may relate to various types of computer operations, such as: (i) web application server requests; (ii) searching an index of information, such as making catalog server requests (for example, a lookup request to a domain name server (dns); (iii) communication server type requests, for example routing a short message service (sms) text message from a sender to a recipient; (iv) computing server request, such as for sharing of computing resources, including central processing unit (cpu) and random-access memory, over a network; (v) database server type requests, for access to a database over a network; (vi) file server type requests, such as a file transfer protocol (ftp) request of a document file; (vii) email server type requests, for example, routing an email message from a sender to a recipient; (viii) proxy server type requests; and/or (ix) web server type requests, such as request for a web page to be sent to the requesting client computer.

Processing continues at operation S260, where token detection sub-module 310, of token processing sub-module 308, of program 300, detects the presence of the debug token included in the client request.

Processing continues at operation S265, where token validation sub-module 312 determines the enabled/disabled status of the debug token.

Processing continues at operation S270 where client authentication sub-module 314 determines the authentication status of the client that issued the client request.

On condition that the debug token is determined to be enabled, and the client is determined to be authenticated, processing continues at operation S275 where thread-specific debug sub-module 306, of request processing module 302, of program 300, initiates thread-specific debug data collection that is conducted during execution of the client request. For example, assume the client requested a web page to be delivered via http protocol. Debug data collection is conducted according to specifics associated with (or encoded within) the debug token. The data collection is conducted only for the processing thread(s) involved in fulfilling the client request. The data collected includes, without limitation, information pertaining to process details, signal details, a complete register dump and/or the process's address map.

Generally speaking, a thread-specific debug state according to the present invention determines which threads, of the global set of threads running on the set of processors that is performing the requested computer operation, will be subject to having debug information collected from them. In a "thread-specific debug state," not all of the threads of this global set of threads will have debug information collected from them because that would be a regular, or standard, debug state. Instead, some sub-set of the global set of threads (that is, less than all of the threads, but at least one thread) will be subject to the logging of debug information. By subjecting less than all of the threads to the collection of debug information, this potentially: (i) makes the collected debug information more targeted, manageable and/or helpful in debugging; and/or (ii) is less computing resource intensive than using a standard debug state.

As mentioned above, in this embodiment, the sub-set of threads from which debug information is collected is defined as the set of threads involved in performing the requested computer operation of the client request. Alternatively, the sub-set of threads may be specified, or otherwise effectively determined, by information included in the debug token itself.

After operation 5275, the requested computer operation is performed by the thread-specific debug state. In this example, server computer is a real, physical computer that uses processor(s) set 204 to perform the requested computer operation. Alternatively, the computer operation may be performed in the cloud, by a virtual machine (VM). Of course, the operations performed by the VM in the cloud will still ultimately be performed by a physical processor (that is, "the bare metal"). In these VM-implemented embodiments, it is the host processor set that will be the basis for determining the global set of threads running on the processor set, from which global set the sub-set of thread(s) of the thread-specific debug state will be drawn.

III. Further Comments and/or Embodiments

Some embodiments of the present invention run in a massively scalable, self-service computing delivery model where processing, storage, networking and applications can be accessed as services over a network such as the internet. Conventional applications deployed in such an environment are typically designed to be highly scalable. Multiple instances of a single application are sometimes deployed, and a load balancer distributes load across those instances. These application instances may be deployed across multiple machines, multiple data centers, even across multiple geographical locations. Further, automatic scaling policies create and/or destroy instances as needed to cope with variable demands. When a problem occurs during processing, it is sometimes helpful to collect detailed debug information for problem analysis and resolution.

Some embodiments of the present invention simplify debugging by enabling narrowly targeted data collection for analysis. For example, consider a product (running on a server, for example, an email server) that processes thousands of message per second in a production scenario. Data collection related to a single message (among the thousands of messages processed per second) is enabled, which is a significant improvement to conventional debugging capabilities.

When a conventional system enters a debug state, the system typically logs diagnostic (debugging) information. In a normal production state, diagnostic logging is not enabled. Logging diagnostic information is expensive, in terms of CPU cycles (to create and format the log entries), and input/output (I/O) throughput (to write the log entries somewhere). So logging of diagnostic information is usually disabled for performance purposes. A conventional debug state (that is, not thread specific) applies to an entire operating system process, and all of the threads inside that process. Although there are varying levels of "debug state", where each level incurs a different performance cost, they all incur some level of performance cost.

Some embodiments of the present invention may include one, or more, of the following features, characteristics and/or advantages: (i) a debug state can be entered on a single thread (or set of threads) operating on a single piece of work (a single request) for the duration of that request; (ii) only those threads targeted in the "thread-specific debug state" incur the performance cost; and/or (iii) threads and operations not targeted by the "thread-specific debug state" are unaffected.

Some embodiments of the present invention may recognize one, or more, of the following facts, potential problems and/or potential areas for improvement with respect to the current state of the art: (i) collection of debugging information may have to be enabled for multiple instances of an application, because in some conventional solutions, it is not possible to target a particular client at a single instance of the application; (ii) enabling collection of debugging information, across multiple instances of an application in a cloud environment that is under heavy load, negatively impacts response times; (iii) requests to a production cloud environment generates large volumes of debugging information that are expensive to store and process; (iv) in some conventional solutions, an administrator responsible for debugging a problem attaches a debugger, and may need to concentrate on processing a single request; (v) interruptions and breakpoints from unrelated requests impact the ability of an administrator to successfully diagnose a problem; (vi) attempts to diagnose a problem by setting up a single instance of the application on the cloud or on premise, are not helpful if the problem occurs, for example, only in a heavily loaded production environment; (vii) attempts to recreate a problem launching requests at the application from an external client, are difficult if the requests are sent to such a development or staging environment, which may be inaccessible without network or firewall changes (for example, in private cloud applications); and/or (viii) a special "debugging mode", where an application is placed into a single instance mode for the purposes of debugging, is not suitable for handling production workload, as it would not scale.

Some embodiments of the present invention may include one, or more, of the following features, characteristics and/or advantages: (i) focuses on enabling debugging information from a production cloud environment for a given request, without affecting other requests; (ii) a client running an application supplies a debugging token as part of a request to the application; (iii) when the application identifies the presence of the debugging token, debug processing is enabled specifically (and only) for that request; (iv) this allows an administrator to launch requests to the application without incurring the problems listed in the paragraph above; (v) it does not matter which instance of the application handles the request; (vi) requests that do not include the token are not affected, and do not incur extra processing costs or generate extraneous debugging information; (vii) a separate instance of the application does not have to be deployed for debugging; and/or (viii) can be practiced in a (non-cloud) computing environment, including on a stand-alone (non-networked) computer.

A debugging token, is sometimes referred to herein as a debug token, and also sometimes referred to as a data collection indicator token. When a valid debug token is detected in a client request to a server computer, the token indicates that data collection is to be conducted in connection with processing of the client request. The collected data is intended to aid analysis and resolution of a problem that occurs during processing of the client request.

In some embodiments of the present invention, when a problem or defect is encountered with an application, the system provides a system administrator with a token. The administrator launches a request (including the token), using information the client of the application provided, to recreate the problem. Alternatively, the token is passed to the client of the application, and the client includes the token in request(s) made to the application. The request(s) trigger collection of debugging information including: (i) service level trace; (ii) accounting & statistics data; (iii) trace of interactions with other external systems; and/or (iv) more detailed logging of requests.

After the request(s), including the token, have been made, and the problem has been recreated, an administrator collects and reviews the collected debugging information to diagnose and resolve the problem. The system collects debugging information only for the requests that include the token. Once the debugging information has been collected, the token is disabled or revoked, so that it will not trigger further collection of debugging information. Alternatively to an administrator reviewing the collected debugging information and diagnosing the problem, in some embodiments of the present invention, reviewing the debugging information and diagnosing the problem is performed automatically by a set of machine logic based rules.

Some embodiments of the present invention work by passing in a token as part of a request to an application. The presence of the token triggers the collection of debugging information for that request only. This token may come from several places, including for example: (i) an administrator may configure a fixed token (such as DEBUGTOKEN) that can be used by any client of the application; (ii) an administrator may generate or provide a unique token that is given to one or more specific clients of the application (allowing identification of which users are triggering the collection of debugging information); and/or (iii) the token may be combined with an overall option (at the application, or cloud environment level) that enables or disables the collection of debugging information when the token is present (which allows an administrator to ensure that debugging information is triggered only when the administrator is debugging one or more problems). The token is then included in request(s) sent to the application.

In some embodiments of the present invention, cloud applications are based on hypertext transfer protocol (HTTP). In applications based on HTTP, the token is included in one or more of several places such as: (i) an HTTP header in a request; (ii) a query string parameter in a request; and/or (iii) elsewhere in the body of a request.

In some embodiments of the present invention, when an application receives a request, it inspects the request to see if the token is present. If the token is present, it optionally verifies and authenticates that the token is valid. If the token is present but not valid, then the request is either rejected or logged and the token ignored. Once a token has been found and validated, then the application uses the token to turn on the collection of debugging information for that request.

In some embodiments of the present invention: (i) a thread, in an application processing a request, sets a flag in thread local storage (TLS) indicating the presence of the token; (ii) TLS is visible to only that thread (the flag will not be visible to other threads processing other requests); and/or (iii) application code decides whether or not to emit debugging information based on the flag in TLS.

Pseudo-Code Example 1:

```
void doStuff ( ) {
    if (FlagPresentInTLS) {
        doExpensiveLoggingOfRequest ( ) ;
    }
    handleRequest ( ) ;
    if (FlagPresentInTLS) {
        doExpensiveLoggingOfResponse ( ) ;
    }
}
```

Once the request has been processed by the thread, the flag in TLS is cleared, so that it is not enabled for subsequent requests (unless a new request also includes a valid token).

In some embodiments of the present invention, a thread, in the application processing the request, brings up a debugger to enable an administrator to inspect the program as it processes the request. The thread fires a breakpoint, which triggers a debugger that an administrator has attached to the running application. Alternatively, the thread establishes an outbound connection to a waiting debugger that an administrator has set up in order to diagnose the problem. Once debugging of the request has been completed, the debugger is detached, such that further requests are processed without debugger intervention (unless a subsequent request also includes a valid token).

Some embodiments of the present invention may recognize one, or more, of the following facts, potential problems and/or potential areas for improvement with respect to the current state of the art: (i) some conventional debuggers support the capability of setting per-thread breakpoints; (ii) however, it is not feasible for an attached debugger to know which thread will handle the requests, as many threads are handling requests; and/or (iii) a user of the debugger does not want to set a breakpoint that is hit by every single request.

In some embodiments of the present invention, breakpoints are triggered for specific requests having the debugging token set. Example mechanisms for triggering breakpoints include: (i) product code triggers a breakpoint not defined in the debugger by using hardware breakpoints (for example, the int3 instruction on x86 will fire a breakpoint); and/or (ii) product code follows a special code path that is invoked when a request is processed having the debugging token set.

Pseudo-Code Example 2:

```
1. void doStuff ( ) {
2.     if (FlagPresentInTLS) {
3.         setABreakpointOnMe ( ) ;
4.     }
5. }
```

In the technique of pseudo-code example 2 above, a user manually sets a breakpoint at line 3. In some embodiments of the present invention, a debugger supports breakpoints that are triggered when an exception of a certain type is thrown.

Pseudo-Code Example 3: (a Variant of Pseudo-Code Example 2):

```
void doStuff ( ) {
    if (FlagPresentInTLS) {
        try {
            throw new DebugBreakpointException ( ) ;
        } catch (Exception e) {
            // ignore, but possibly now under control of the debugger.
        }
    }
}
```

Alternatively, in some embodiments of the present invention, a thread establishes an outbound connection to a waiting debugger (for example, a debugger that an administrator has set up), to help diagnose the problem. Once a connection to the debugger is established, the thread hands over control of processing to the debugger and/or an administrator.

Pseudo-Code Example 4:

```
void doStuff ( ) {
    if (FlagPresentInTLS) {
        establishConnectionToDebugger ( ) ;
    }
}
```

In some embodiments of the present invention, the technique of pseudo-code example 4 connects automatically to a debugger, without having to restart the process. This technique is useful where the cloud environment spans numerous running processes (for example, for load balancing purposes), and the technique relieves an administrator of having to connect a debugger to all of those numerous running processes, in trying to ensure that a debugger is connected to the one process that is being debugged.

In some embodiments of the present invention, once debugging of the process is complete, the debugger is detached, and further requests are processed without debugger intervention (unless and/or until a subsequent request also includes a valid token).

Some embodiments of the present invention may include one, or more, of the following features, characteristics and/or advantages: (i) concerned with the debugging of downstream processes that occur on server systems; (ii) enable selective debugging processes on a single request going into a cloud server system; (iii) enables the application to act in a debug mode for a single user, out of potentially millions; and/or (iv) permits the targeting of either selected applications or single requests to a single application.

In some embodiments of the present invention, a list of valid tokens is available (and/or known) to all threads. A token received for a given request would not be distributed among all threads, but only a thread that is servicing the current request. However, asynchronous programming omits tracing if the request was passed onto other threads for full or partial processing. In one example, of many possible solutions, the token is stored on a request object that is passed between threads.

In some embodiments of the present invention, a user enables tracing for only the user's own request(s). The user sends in a token along with the actual request, not via an application programming interface (API) call or an external command. The token is extracted from the user's request by the system. The token enables tracing for only the thread that handles the user's request. The token uses a switch in thread local storage (TLS). Once the user's request has finished processing, the thread-specific tracing is disabled until the thread handles another request with the token. Other threads handling requests (from the same user, or other users) in the system are unaffected if they do not include the token. The threads continue to function normally, do not trace, and do not incur a tracing-induced performance penalty.

In some embodiments of the present invention, there is no need to target the token delivery. All instances of an application are informed that a user may send in a request with a token. Further, in some embodiments, instances of an application are informed as to which tokens are possibly valid. A load balancer and/or gateway distributes requests among all instances of an application. If such a token is present in a user's request, the application is permitted to enable tracing for only the thread handling the user's request. All other threads in that instance, and all of the threads in all of the other instances of the application, can continue handling production workload without impacting users.

Some embodiments of the present invention enable an action that is relevant to the cloud industry where unique, thread-specific, debug instances are invoked without applying the same debug level to all current system users, and without having to: (i) manage a separate pool of debug instances; and/or (ii) route requests to those instances.

Some embodiments of the present invention may include one, or more, of the following features, characteristics and/or advantages: (i) enters a thread-specific debug state through the detection of a token present with an issued request; (ii) passes a debug token through successive requests; (iii) generates and provides a debug token for use in the system; (iv) authorizes a requestor to supply a debug token in a request; (v) authenticates a requestor to verify their authorization to supply a debug token in a request; (vi) rejects or fails a request with a debug token if the functionality is disabled, or if the requestor is not authorized to supply the debug token; (vii) ignores a debug token in a request if the functionality is disabled; and/or (viii) ignores a debug token in a request if the requestor is not authorized to supply the debug token. Further with respect to item (ii) above, in some embodiments, the client makes multiple requests in succession and/or in parallel. The multiple requests may all use the same debug token (or copies thereof), unique debug token(s), or a mix of the same debug token(s) and unique debug token(s), in any combination.

Using a token to cause a system to enter a thread-specific debug state is quite different than using a token to enter a general (non-thread-specific) debug state for reasons that may include the following: (i) thread-specific debug states are more difficult (expensive) to implement, technically; (ii) a thread-specific debug state adds another layer of programming that would need to be maintained; (iii) a thread-specific debug state typically requires cooperation from software developers (who do not necessarily reap any benefits from the fact that the debug state is thread-specific); and/or (iv) when control of the debug state is token-controlled, this already imposes a large degree of control on the volume of logged data, meaning that one would generally not believe that thread-specificity would be needed, or particularly helpful, in a token-controlled debug state context (even though the logging reduction does, in fact appear to be helpful in a token-controlled context, under some embodiments of the present invention).

IV. Definitions

Token: a data object which represents the right to perform some operation.

Requestor: a user, a client computer, or any module capable of supplying a client request to a server.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving, by a server computer, through a communication network and from a requestor client application, a client request including: (i) a request for the server computer to perform a computer operation, and (ii) a debug token;
   responsive to the client request, starting to perform, by the server computer, the computer operation on a sub-set of thread(s) running on a set of processor(s), where the set of processor(s) are running a set of thread(s) that: (i) includes all threads of the sub-set of threads, and (ii) includes at least one thread that is not in the sub-set of thread(s), wherein the sub-set of thread(s) is determined based on information in the debug token;
   entering, by the set of processor(s), a thread-specific debug state so that: (i) debug information is logged with respect to the sub-set of thread(s), and (ii) debug information is not logged with respect to any thread(s) included in the set of thread(s) but not included in the sub-set of thread(s); and
   disabling the debug token.

2. The computer-implemented method of claim 1 wherein:
   the server computer is implemented by a virtual machine (VM); and
   the set of processor(s) are processors of a physical host computer upon which the VM is running.

3. The computer-implemented method of claim 1 wherein the computer operation is one of the following types of computer operations: (i) hosting web applications (application server); (ii) maintaining an index of information (catalog server); (iii); maintaining a communications environment (communications server); (iv) sharing computing resources (computing server); (v) sharing a database (database server); (vi) sharing files (file server); (vi) providing email communications (mail server); (vii) intermediating between a client and a server (proxy server); and/or (viii) hosting web pages (web server).

4. The computer-implemented method of claim 1 wherein:
   the set of processor(s) is a single processor; and
   the sub-set of thread(s) is a single thread.

5. The computer-implemented method of claim 2 wherein the VM is in a cloud.

6. The computer-implemented method of claim 1 further comprising:
   determining, by the server computer, whether debug token functionality is enabled;

determining, by the server computer, whether the requestor client application is authorized to supply the debug token; and on condition that the debug token functionality is enabled and on further condition that the requestor is authorized to supply the debug token, processing the client request.

7. The computer-implemented method of claim 1 further comprising:

passing, by the server computer, the debug token through successive requests.

8. The computer-implemented method of claim 1 further comprising:

authenticating, by the server computer, a requestor; and responsive to authentication of the requestor, verifying the requestor's ability to supply a debug token in the request.

9. A computer program product comprising a computer readable storage medium having stored thereon:

first program instructions programmed to receive, by a server computer, through a communication network and from a requestor client application, a client request including: (i) a request for the server computer to perform a computer operation, and (ii) a debug token;

responsive to the client request, second program instructions programmed to start to perform, by the server computer, the computer operation on a sub-set of thread(s) running on a set of processor(s), where the set of processor(s) are running a set of thread(s) that: (i) includes all threads of the sub-set of threads, and (ii) includes at least one thread that is not in the sub-set of thread(s), wherein the sub-set of thread(s) is determined based on information in the debug token;

third program instructions programmed to enter, by the set of processor(s), a thread-specific debug state so that: (i) debug information is logged with respect to the sub-set of thread(s), and (ii) debug information is not logged with respect to any thread(s) included in the set of thread(s) but not included in the sub-set of thread(s); and fourth program instructions programmed to disable the debug token.

10. The computer program product of claim 9 wherein:

the server computer is implemented by a virtual machine (VM); and the set of processor(s) are processors of a physical host computer upon which the VM is running.

11. The computer program product of claim 9 wherein the computer operation is one of the following types of computer operations: (i) hosting web applications (application server); (ii) maintaining an index of information (catalog server); (iii); maintaining a communications environment (communications server); (iv) sharing computing resources (computing server); (v) sharing a database (database server); (vi) sharing files (file server); (vi) providing email communications (mail server); (vii) intermediating between a client and a server (proxy server); and/or (viii) hosting web pages (web server).

12. The computer program product of claim 9 wherein:

the set of processor(s) is a single processor; and the sub-set of thread(s) is a single thread.

13. The computer program product of claim 10 wherein the VM is in a cloud.

14. The computer program product of claim 9 further comprising:

fourth program instructions programmed to determine, by the server computer, whether debug token functionality is enabled;

fifth program instructions programmed to determine, by the server computer, whether the requestor client application is authorized to supply the debug token; and on condition that the debug token functionality is enabled and on further condition that the requestor is authorized to supply the debug token, sixth program instructions programmed to process the client request.

15. The computer program product of claim 9 further comprising:

fourth program instructions programmed to pass, by the server computer, the debug token through successive requests.

16. The computer program product of claim 9 further comprising:

fourth program instructions programmed to authenticate, by the server computer, a requestor; and responsive to authentication of the requestor, fifth program instructions programmed to verify the requestor's ability to supply a debug token in the request.

17. A computer system comprising:

a processor(s) set; and a computer readable storage medium;

wherein:

the processor(s) set is structured, located, connected and/or programmed to run program instructions stored on the computer readable storage medium; and the program instructions include:

first program instructions programmed to receive, by a server computer, through a communication network and from a requestor client application, a client request including: (i) a request for the server computer to perform a computer operation, and (ii) a debug token;

responsive to the client request, second program instructions programmed to start to perform, by the server computer, the computer operation on a sub-set of thread(s) running on a set of processor(s), where the set of processor(s) are running a set of thread(s) that: (i) includes all threads of the sub-set of threads, and (ii) includes at least one thread that is not in the sub-set of thread(s), wherein the sub-set of thread(s) is determined based on information in the debug token;

third program instructions programmed to enter, by the set of processor(s), a thread-specific debug state so that: (i) debug information is logged with respect to the sub-set of thread(s), and (ii) debug information is not logged with respect to any thread(s) included in the set of thread(s) but not included in the sub-set of thread(s);

fourth program instructions programmed to disable the debug token.

18. The computer system of claim 17 wherein:

the server computer is implemented by a virtual machine (VM); and the set of processor(s) are processors of a physical host computer upon which the VM is running.

19. The computer system of claim 17 wherein the computer operation is one of the following types of computer operations: (i) hosting web applications (application server); (ii) maintaining an index of information (catalog server); (iii); maintaining a communications environment (communications server); (iv) sharing computing resources (computing server); (v) sharing a database (database server); (vi) sharing files (file server); (vi) providing email communications (mail server); (vii) intermediating between a client and a server (proxy server); and/or (viii) hosting web pages (web server).

20. The computer system of claim 17 wherein:
the set of processor(s) is a single processor; and
the sub-set of thread(s) is a single thread.

* * * * *